United States Patent Office 3,068,633
Patented Dec. 18, 1962

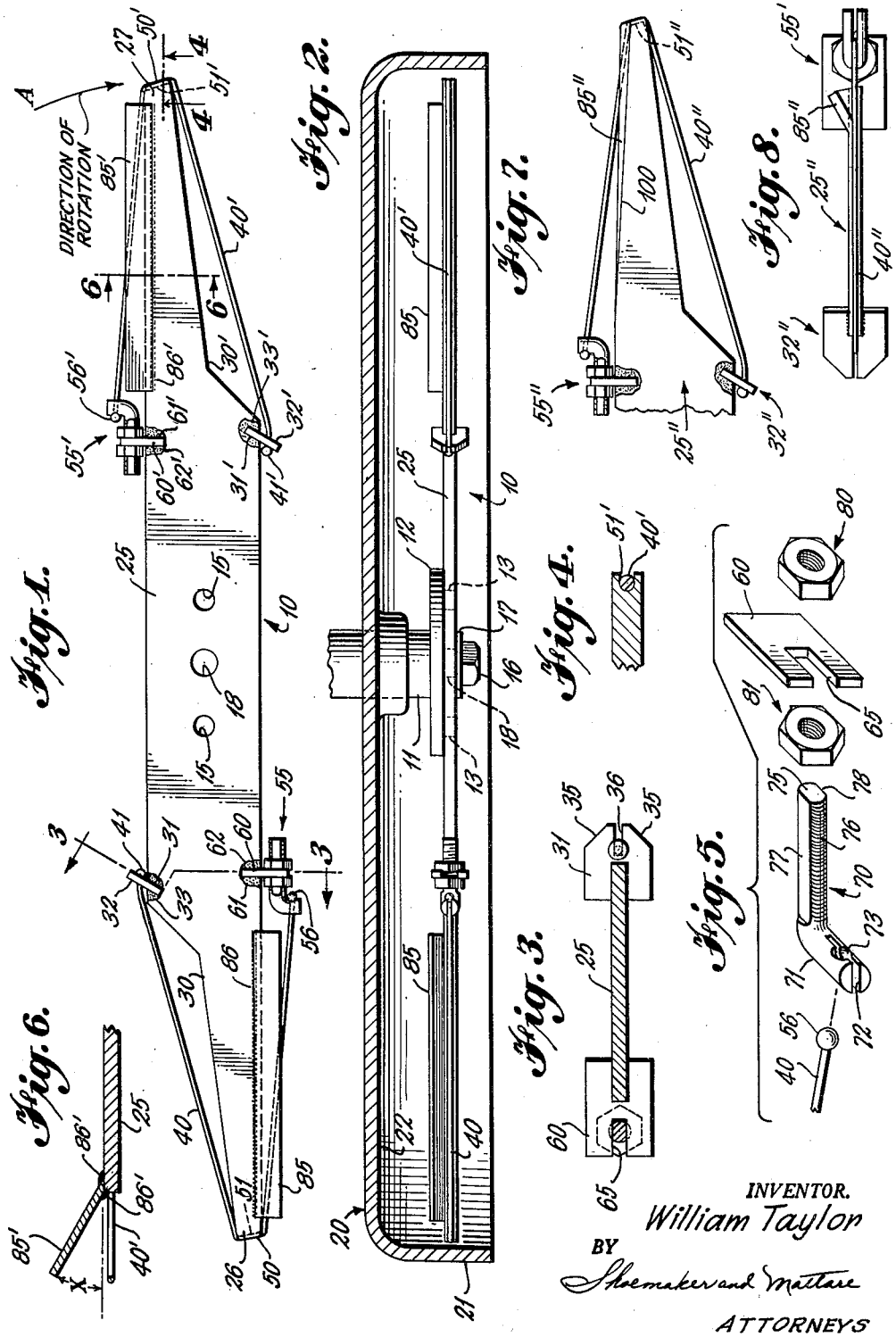

3,068,633
BLADE FOR ROTARY-TYPE LAWN MOWERS
William Taylor, 2309 N. 11th St., Arlington, Va.
Filed Jan. 26, 1961, Ser. No. 85,117
12 Claims. (Cl. 56—295)

The present invention relates to a new and novel blade for rotary-type lawn mowers and more particularly to a rotary cutting means having at the opposite ends thereof spaced cutting means in the form of flexible strands such as wire.

The present invention is directed particularly to blades utilized in rotary-type mowers, and the blade of the present invention is particularly directed to a structure which can be readily substituted for the conventional blade now commonly employed in such mowers. The conventional blade as employed in such rotary-type mowers generally comprises an elongated flat steel bar having cutting edges formed at the opposite ends thereof on opposite sides of the bar and are usually inclined downwardly out of the plane of the bar.

The present invention includes a support structure upon which are mounted a pair of spaced wires at the opposite ends thereof, and the overall arrangement is preferably such as to provide only a slightly greater vertical dimension than the conventional flat blade as employed in rotary mowers and accordingly, the blade of the present invention can readily be mounted on any conventional mower. The vertical dimension referred to above is a critical factor since there is usually a very small vertical clearance between the blade and the protective cowling disposed thereover. Consequently, if the blade were to have a substantially greater vertical dimension than the conventional type of construction, it could not be successfully utilized with mowers now in use.

It is a commonly accepted fact that conventional mower blades lose their cutting edges fairly rapidly, thereby resulting in a less clean cut on the blades of grass with which the mower is employed. Due to the loss of sharpness of the cutting edge, the tops of the blades are actually to a large extent beaten off rather than cut cleanly from the lower portion of the blades. This results in an uneven appearance to the cut lawn, and furthermore such beating action of the blades of grass tends to damage the cellulose structure thereof which results in premature browning of the upper portions of the grass blades. This is, of course, a disadvantageous feature since it is desired to obtain a lawn which has a smooth appearing surface and one which is as green as possible since browing of the grass is considered to be less pleasing to the eye.

The present invention overcomes the disadvantages attendant with dulling of the cutting edges of conventional blades by employing relatively small flexible strands in the form of wire. These cutting wires form a good cutting edge, and they do not lose their degree of sharpness, but if anything, the sharpness of the cutting edge increases with use. Accordingly, a very sharp cutting edge is effectively provided at all times while the blade is in operation.

Separate cutting means is provided adjacent each end portion of the blade, each of these separate cutting means comprising a single separate wire, each wire being anchored at one end and having the opposite end thereof connected to an adjusting means which is adapted to adjust the tension of the associated wire. This tensioning means enables the wire to be continuously adjusted to obtain the desired degree of tension in the wire.

The utilization of cutting wires has a number of important advantages. Firstly, the wire is to a certain degree flexible and consequently is better adapted to resist damage and breakage upon striking a hard object as compared to conventional steel blades having a cutting edge formed thereon. This is because the flexible wire will give momentarily when struck by a hard object, and the object will be generally thrown clear, whereas a conventional steel blade will not absorb the impact in such a manner.

An additional important advantage is the fact that if the cutting wire should be broken, it is a very simple matter to replace the cutting wire, and the cost of an additional cutting wire is very small.

This is a distinct advantage as compared to conventional steel blades wherein it is necessary to regrind the cutting edge if it should become excessively nicked, and furthermore, it may be necessary to replace the entire blade of prior art blades should the end portion be damaged whereas in the present invention if any damage occurs, it will more than likely occur only to the cutting wires themselves.

By employing a separate relatively short length of wire at each end portion of the blade, damage to one of the wires does not necessitate replacement or repair of the other wire, and accordingly, any damage which may occur can be remedied with a minimum of time and effort and involving a minimum amount of cost. Furthermore, the provision of separate cutting wires permits the cutting means at each end portion of the blade to be individually adjusted.

In the illustrated embodiment of the present invention, the support means is shown as comprising an elongated flat body which provides a strong rigid support for the cutting wires, and furthermore, it provides the desired mass so that the cutting blade will maintain its momentum when cutting through fairly heavy grass.

An object of the present invention is to provide a new and novel blade for rotary type lawn mowers having a relatively small vertical dimension such that it can be substituted for conventional flat bar rotary blades.

Another object of the invention is the provision of flexible cutting means for rotary type lawn mowers which has a high degree of strength and rigidity and yet which is not as susceptible to damage as are conventional blades.

A further object of the invention is to provide a blade for rotary type lawn mowers including wire cutting means, the tension of which can be readily adjusted at all times.

Still another object of the invention is to provide a blade for rotary type lawn mowers including separate and individual cutting means at the opposite ends of the blade thereby reducing to a minimum the breakage loss occurring with the blade and further providing for easy adjustment of the cutting means.

A still further object of the invention is to provide a blade for rotary-type lawn mowers which is simple and inexpensive in construction and yet efficient and reliable in operation.

Other objects and many attendant advantages of the present invention will become more apparent when considered in connection with the specification and accompanying drawings, wherein:

FIG. 1 is a plan view of the blade according to the present invention;

FIG. 2 is an elevation of the blade shown in FIG. 1 as associated with the driving shaft of a lawn mower;

FIG. 3 is a section taken substantially along line 3—3 of FIG. 1 looking in the direction of the arrows;

FIG. 4 is an enlarged section taken along line 4—4 of FIG. 1 looking in the direction of the arrows;

FIG. 5 is an exploded perspective view illustrating the adjustment means of the present invention;

FIG. 6 is an enlarged sectional view taken along line 6—6 of FIG. 1 looking in the direction of the arrows;

FIG. 7 is a top view of an end portion of a modified form of the invention; and

FIG. 8 is an enlarged end view of the modification shown in FIG. 7.

Referring now to the drawings wherein like reference characters designate corresponding parts throughout the several views, the blade according to the present invention is shown in its entirety in FIGS. 1 and 2, the blade being indicated generally by reference numeral 10 and being connected to the power driven shaft 11 of a conventional rotary lawn mower. The lower end of driven shaft 11 includes an outwardly extending disc-like portion 12 having a pair of spaced lugs 13 depending therefrom and being disposed in diametrically opposed positions relative to the axis of rotation of the shaft 11.

These lugs 13 are snugly received within a corresponding pair of openings 15 formed through the body of blade 10 so as to prevent relative rotation between the blade and the driven shaft when the blade is mounted in operative position. The blade is affixed to the driven shaft by means of a threaded nut 16 which bears against the washer 17, the shank of the nut fitting up through a central opening 18 formed in the blade and being threaded within a correspondingly threaded opening formed at the lower end of the driven shaft 11. This manner of attachment of the body of the blade to the driven shaft of the lawn mower is relatively conventional.

In FIG. 2, the protective cowling 20 of the lawn mower is illustrated, it being noted that the cowling 20 includes a depending skirt portion 21 which is spaced closely adjacent the outer end portion of the blade and the upper wall portion 22 of the cowling is disposed a relatively small vertical distance above the top portion of the blade. The cowling is, of course, provided with a suitable outlet for the cut grass as is conventional in the art.

As mentioned previously, the conventional flat bar type rotary blade is adapted to operate with this type of cowling wherein a small vertical clearance is provided and it will be noted that the present invention is readily adapted to fit within and operate within this type of conventional cowling arrangement.

The blade includes the elongated flat body means 25 having opposite end portions 26 and 27. The opposite end portions of the blade are symmetrical and substantially identical with one another, and accordingly, similar reference numerals may be applied to the corresponding parts at opposite ends of the blade. For the sake of simplicity, the reference numerals applied to various components at the lefthand portion of the blade as seen in FIGS. 1 and 2 will be primed when applied to the similar components at the righthand portion of the blade as seen in FIGS. 1 and 2.

Cut-out portions 30 and 30' are provided in the leading edge portions of the opposite ends of the blade body-means 25, these cut-out portions serving to provide a space immediately rearwardly of the leading edge cutting wires to permit the cutting wires to effectively perform the desired cutting function.

A pair of slots 31 and 31' are formed in the body means 25 a short distance radially inwardly of the inner ends of the cut-out portions 30 and 30', these slots 31 and 31' being disposed at an angle with respect to the associated edge portion of the body means. Anchor members 32 and 32' are disposed within the associated slots 31 and 31', the anchor members being welded in place by bodies of weld indicated by reference numerals 33 and 33'.

Referring to FIG. 3, the construction of anchor member 31 is more clearly illustrated, it being noted that the anchor member 31 extends substantially equidistantly above and below the top and bottom surfaces of the body means 25. Anchor member 31 has the outer corner portions thereof cut away as indicated at 35, and a central slot 36 is formed through the outer end thereof and extends inwardly toward the body means 25, this slot being adapted to receive one end portion of the cutting wire for locking the cutting wire in place.

As seen most clearly in FIG. 1, the cutting wire 40 is provided with an enlarged portion 41 formed at one end thereof, this enlarged portion for example comprising a small rounded head which is welded or otherwise securely attached to the end of the wire. It is apparent that when the end portion of the wire is disposed within the slot 36 in the anchor member with the enlarged portion 41 disposed behind the anchor member as shown, this end portion of the wire is firmly anchored in place, the angular position of the anchor member ensuring that the cutting wire can not slip out of position. The wire 40' provided at the opposite portion of the blade is provided with a corresponding enlarged portion 41' held in place by the anchor member 32' which is also, of course, provided with a slot corresponding to the slot 36 shown in FIG. 3.

The cutting wire employed in the present invention must be of a resilient yet strong construction, and accordingly it is preferred that the wire be of the so-called "music wire" or "piano wire" type formed of spring steel.

In a typical example, the piano wire may be #18 American Wire Gauge construction having a diameter of .018 inch. It is contemplated that this size will be quite satisfactory for cutting grass, and the diameter of the wire should not be substantially greater than this size, although the wire may be of a considerably smaller diameter. This type of cutting wire is quite rugged and sufficiently resilient that if it should strike a solid object such as a rock or the like, the wire will resist breakage and in most instances may be slightly deformed. This deformation can be compensated for by adjusting the tension on the wire as hereinafter described.

The body means 25 must, of course, be of a relatively heavy-duty construction and in a typical example, may comprise a flat steel member of approximately ⅛ inch thickness.

The tips 50 and 50' of the body means slope rearwardly relative to the direction of rotation of the blade as indicated by arrow A in FIG. 1, and as seen most clearly in FIG. 4, the tip portions are provided with grooves 51 and 51' which are adapted to receive the associated cutting wires and protect the portions of the cutting wires which extend around the outer ends of the blade.

The ends of each of the cutting wires opposite to the portions which are anchored in place are secured to adjusting means 55 and 55', the associated end portions of the wires being provided with enlarged portions 56 and 56' which cooperate with the adjusting means for retaining these portions of the wires as more fully described hereinafter.

As seen in FIG. 1, each of the adjusting means includes a flat member 60 and 60' which extends laterally of the blade and which is seated within suitable slots 61 and 61' provided in the plate. The members 60 are secured in position by bodies of weld 62 and 62', and as seen in FIG. 3, it will be noted that the members 60 extend substantially equidistantly above and below the upper surfaces of the body means 25. It will also be noted as seen in FIG. 3 that the outer end portion of member 60 is provided with an elongated slot 65, the member 60' being, of course, provided with a similar slot for receiving the associated end portion of the cutting wires.

Referring now to FIG. 5, an exploded view of the adjusting means at the lefthand portion of the apparatus shown in FIGS. 1 and 2 is illustrated. The adjusting means includes an adjusting bolt 70 of substantially L-shaped configuration and including a shorter leg portion 71 having a slot 72 formed therethrough and extending longitudinally thereof. A substantially spherical seat 73 is provided in arm 71 on the inner surface thereof and extends on opposite sides of the slot 72. It will be understood that wire 40 fits through slot 72 and that the enlarged portion 56 at the outer end portion thereof is substantially spherical in configuration and is adapted to seat snugly within the spherical depression 73 formed in the adjusting bolt 70. It is apparent that this cooperation of the components will serve to securely connect the end portion of the cutting wire 42 with the adjusting bolt and to prevent the cutting wire from becoming accidentally disengaged therefrom during operation of the apparatus.

The opposite leg portions 75 of the adjusting bolt is provided with a screw thread 76 therearound, and diametrically opposite portions of the screw thread are cut away to form flats 77 and 78. When the adjusting bolt is disposed within the slot 65 of member 60, the flat faces 77 and 78 engage the flat sides of the slot 65 for preventing relative rotation between the adjusting bolt and the member 60 while at the same time permitting movement of the adjusting bolt longitudinally thereof through the slot 65.

A tensioning nut 80 is threaded upon the outer end of the threaded leg portion 75 and is adapted to draw up the adjusting bolt through the slot 65 for applying tension to the cutting wire. It is apparent that any desired degree of tension can be obtained by threading nut 80 along the threaded leg 75 of the adjusting bolt.

A lock nut 81 is threaded upon the leg 75 of the adjusting bolt at the opposite side of member 60 from tensioning nut 80 and it is apparent that nut 81 can be advanced against member 60 to lock the adjusting assembly in any desired adjusted position. The adjusting means 55' is, of course, of identical construction with the adjusting means 55 hereinabove described.

It will be noted that with the anchor and adjusting arrangement of the present invention, the cutting wires 40 and 40' are positioned such that they effectively form the cutting edge of the blade whereby upon rotation of the blade, the wires 40 and 40' will serve to cut the blades of grass.

As seen particularly in FIG. 2, the arrangement is such that the wires 40 and 40' lie substantially equidistantly between the upper and lower surfaces of the body means 25, and accordingly, the entire assembly is substantially balanced about a plane passing through the body means 25 midway between the upper and lower surfaces thereof.

As sen in FIGS. 1 and 2 and particularly in FIG. 6, the trailing edge portions of the blade at the opposite ends thereof are provided with fins or fan blades 85 and 85', these fins being angulated rearwardly of the direction of rotation of the blade as seen especially in FIG. 6, and being secured in operative position by bodies of weld 86 and 86'. These fins are disposed at an angle X as seen in FIG. 6 relative to the upper surface of the body means, and this angle X should not exceed 60°. It is apparent that the fins 85, 85' will serve to produce an updraft during rotation of the blade which serves to pull the blades of grass upwardly so that the upper ends thereof will be raised into a position such that the cutting wires 40 and 40' are adapted to effectively cut the blades of grass.

Referring now to FIGS. 7 and 8, a modification of the invention is illustrated wherein the body means 25" is substantially identical with that previously shown, and the anchor means 32" and adjustment means 55" are also of similar construction to that previously described. The only difference in construction of this modification is the fact that the fin means 85" formed at opposite ends of the blade are integral with the body means and are formed by bending up the trailing edge portion of the body means at each end thereof along a line 100. In this manner, the fins are formed in a most simple manner and effectively carry out the same function as the fins hereinbefore described.

The cutting wire 40" is, of course, of the same construction as the cutting wires previously illustrated, and the cutting wire fits within a groove 51" formed at the outer end of the blade. It will, of course, be understood that the opposite end portion of the blade from that shown in FIGS. 7 and 8 is of identical construction.

Whereas the support means of the overall rotary cutting means in the aforedescribed embodiments as illustrated has an elongated flat bar, it should also be understood that this support means upon which the cutting wire edges are adjustably mounted may also assume other forms. For example, the support means upon which the cutting wires are mounted may also be tubular in configuration, the cutting wires being adjustably mounted thereon in a manner similar to that aforedescribed.

It is apparent from the foregoing that there is provided a new and novel blade for rotary-type lawn mowers wherein the blade is provided with a small vertical dimension such that it can be readily employed as a substitute for conventional rotary blades which are formed of a flat bar of metal. The construction of the present invention provides a high degree of strength and rigidity and yet is not as susceptible to damage as conventional blades. Even if one of the cutting wires of the device should become damaged, often any deformation thereof can be readily accommodated for merely by increasing the tension on the wire and if the wire need be replaced, it is evident that the monetary loss is substantially less than that which occurs when the cutting edge of a conventional blade is damaged. The wire cutting means of the present invention can be readily adjusted, and the tension can furthermore be adjusted while the blade is in operative position on the associated lawn mower. The device is quite simple and inexpensive in construction, and yet is efficient and reliable in operation.

As this invention may be embodied in several forms without departing from the spirit os essential characteristics thereof, the present embodiment is therefore illustrative and not restrictive, and since the scope of the invention is defined by the appended claims (all changes that fall within the metes and bounds of the claims or that form their functional as well as conjointly cooperative equivalents are therefore intended to be embraced by those claims.

I claim:

1. A blade for rotary-type lawn mowers comprising an elongated body means having opposite end portions, separate spaced cutting means disposed adjacent the opposite end portions of said body, the cutting means at each end portion comprising a separate and individually mounted flexible wire strand, said wire strands being spaced forwardly and laterally of said body means in the direction of rotation of said mower.

2. A blade for rotary-type lawn mowers comprising an elongated flat body means having opposite end portions, spaced separate cutting means disposed adjacent each of said end portions, each of said cutting means comprising a flexible wire strand, said strand including a cutting portion spaced forwardly and laterally from said body means and effectively forming a leading cutting edge of the blade for cutting grass and the like.

3. Apparatus as defined in claim 2, including means for maintaining each of said flexible strands in a taut condition to provide an efficient cutting operation while in use.

4. A blade for rotary type lawn mowers comprising an elongated flat rigid body means having opposite end portions, separate cutting means disposed adjacent each of said end portions, said cutting means comprising a wire having opposite end portions, each of said wires being spaced forwardly and laterally of said body means in the direction of rotation of said mower, anchor means secured to said body means for maintaining one end portion of each of said wires in a fixed position, and adjusting means secured to said body means for adjusting the position of the opposite end of each of said wires.

5. Apparatus as defined in claim 4, wherein an intermediate portion of each of said cutting wires extends around and is supported by an end portion of said blade.

6. A blade for rotary-type mowers comprising an elongated flat rigid body means adapted to rotate about an axis extending substantially normally thereto and including means to attach the body means to a driving means of a rotary mower, said body means including opposite end portions, first anchor means extending laterally from one side of said body means adjacent one end portion thereof, second anchor means extending laterally from the other side of said body means adjacent the opposite end portion thereof, first adjusting means extending laterally from said other side of the body means adjacent said one end portion of the body means, second adjusting means extending laterally from said one side of the body means adjacent the opposite end of the body means, and a pair of cutting wires, each of said cutting wires including a first end portion connected with said anchor means for fixing said end portion in position, each of said first end portions of said cutting wires being spaced forwardly and laterally of said body means in the direction of rotation of said mower, and each of said cutting wires including an opposite end portion engaged with one of said adjusting means, an intermediate portion of each of said wires engaging and being supported by one end portion of said body means, whereby the tension on each of said cutting wires may be individually adjusted.

7. Apparatus as defined in claim 6, wherein said adjusting means includes a member extending laterally from said body means and having a slot formed therethrough, and an adjusting bolt means extending through said slot, nut means for maintaining said adjusting bolt means in operative position, said adjusting bolt means including means for receiving and maintaining in position an end portion of one of said wires.

8. Apparatus as defined in claim 6, wherein each of said cutting wires is provided with an enlargement at the opposite ends thereof, said anchor means and said adjusting means including slots for receiving the end portions of said wires such that said enlargements effectively prevent accidental release of said wires from the associated anchor means and adjusting means.

9. Apparatus as defined in claim 6, wherein said intermediate portions of each of said cutting wires is seated within a groove formed in each of the end portions of the body means.

10. Apparatus as defined in claim 6, including fan blade means on said body means for producing an updraft tending to raise grass into a position to facilitate cutting thereof.

11. In combination with the driving shaft of a rotary lawn mower, a flat elongated rigid body means, said body means being secured at the central portion thereof to said driving shaft and extending substantially normally to the axis of rotation of said driving shaft, said body means having opposite end portions, separate cutting means disposed adjacent each of said opposite end portions and spaced forwardly and laterally of said body means in the direction of rotation of said mower, said cutting means at each end of said body means comprising a separate cutting wire, anchor means supported by said body means adjacent each end of the body means, a first end portion of each of said cutting wires being operatively connected and anchored to one of said anchor means, and adjusting means disposed adjacent each end portion of the body means, the opposite end portion of each of said cutting wires being operatively connected to said adjusting means, and means for locking said adjusting means in a plurality of adjusted positions for adjusting the degree of tension on each of said cutting wires.

12. Rotary cutting means for rotary-type lawn mowers comprising a support means having opposite end portions, separate spaced cutting means disposed adjacent the opposite end portions of said support means, the cutting means at each end portion comprising a separate and individually mounted flexible wire strand, each said wire strand being disposed forwardly and laterally of said support means in the direction of rotation of said mower.

References Cited in the file of this patent

UNITED STATES PATENTS 2,762,188    Klein _____ Sept. 11, 1956